United States Patent
Smith et al.

(10) Patent No.: US 10,956,932 B2
(45) Date of Patent: Mar. 23, 2021

(54) SYSTEM FOR PROVIDING PROOF AND ATTESTATION SERVICES FOR CLAIM VERIFICATION

(71) Applicant: ADOBE INC., San Jose, CA (US)

(72) Inventors: Kevin Gary Smith, Lehi, UT (US);
John Bevil Bates, Highland, UT (US);
Xuejun Xu, Cupertino, CA (US);
Shriram Venkatesh Shet Revankar, San Jose, CA (US)

(73) Assignee: ADOBE INC., San Jose, CA (US)

(*) Notice: Subject to any disclaimer, the term of this patent is extended or adjusted under 35 U.S.C. 154(b) by 106 days.

(21) Appl. No.: 16/164,324

(22) Filed: Oct. 18, 2018

(65) Prior Publication Data
US 2020/0126116 A1 Apr. 23, 2020

(51) Int. Cl.
*G06Q 30/00* (2012.01)
*G06Q 30/02* (2012.01)

(52) U.S. Cl.
CPC .............................. *G06Q 30/0248* (2013.01)

(58) Field of Classification Search
None
See application file for complete search history.

(56) References Cited

U.S. PATENT DOCUMENTS

| | | | | |
|---|---|---|---|---|
| 6,678,716 B1* | 1/2004 | Pronsati, Jr. | ..... | G06Q 10/06312 709/201 |
| 2006/0285665 A1* | 12/2006 | Wasserblat | ......... | G06Q 20/4016 379/114.14 |
| 2016/0132800 A1* | 5/2016 | Davar | ................ | G06Q 10/0637 705/7.36 |
| 2016/0140446 A1* | 5/2016 | Adderly | ................. | G06N 5/022 706/51 |
| 2020/0126116 A1* | 4/2020 | Smith | ................ | G06Q 30/0248 |

OTHER PUBLICATIONS

EIC 3600 STIC Search Report for U.S. Appl. No. 16/164,324, dated Aug. 12, 2020. (Year: 2020).*

* cited by examiner

*Primary Examiner* — Matthew T Sittner
(74) *Attorney, Agent, or Firm* — Shook Hardy & Bacon LLP

(57) ABSTRACT

Embodiments of the present invention provide systems, methods, and computer storage media directed to a proof and attestation service that can confirm the veracity of a claim or a statement of truth based on data dynamically-retrieved from various data repositories. A server device receives, from a client device, a request to determine the veracity of a claim or a statement of truth. The server device is generally a trusted computing device, having privileged-access to a variety of data repositories that the client device may or may not access. The server device can select one or more data repositories based on the claim, obtain results data from the selected one or more data repositories, and evaluate each result to determine whether it corresponds to or contradicts the claim. A veracity score can be calculated for the claim or for a result that corresponds to or contradicts the claim. The server device can generate an attestation notification that includes the claim or the result for communication to the requesting client device. In this way, the client device can utilize the proof and attestation service, facilitated via the server device, to determine a claim's veracity or its calculated likelihood of being true.

20 Claims, 6 Drawing Sheets

SYSTEM FOR PROVIDING PROOF AND ATTESTATION SERVICES FOR CLAIM VERIFICATION

BACKGROUND

Digital information is collected on a large scale by various entities, including but not limited to merchant retailers, wholesalers, manufacturers, social media services, web service providers, telecommunication companies, employers, and the like. Digital information is a key component to the success of modern-day businesses. The advertising industry, which includes marketing companies, media services, and advertising agencies, among others, relies on digital information to target audiences and cater communications to effectively improve consumer relations. The accuracy of digital information, like any piece of information, can be outdated, corrupted, or susceptible human error. Gathering digital information from publicly-available resources, such as social media websites, is a challenging task and the reliability of such resources can only be afforded a limited amount of credibility. Moreover, as the world's reliance on digital information increases, so does its need to trust the accuracy of digital information and the sources from which the digital information is obtained.

Generally speaking, entities that create and maintain digital information can be more reliable and less susceptible to error. For instance, retailers typically record customer data and all related transactions facilitated through their computing systems. Manufacturers also maintain records of users of their products, through registered account data or registrations of products or warranties, by way of example. Even still, this digital information can be susceptible to human error, corruption, or expiration. Such errors result in wasted efforts and resources on behalf of advertisers and marketers who rely on the accuracy of the information. Provided the foregoing, it would be beneficial to have a system that provides seekers of digital information a means for cross-checking their requested data. Unfortunately these sources of digital information are typically not publicly available, and are oftentimes sold to advertisers or requesting entities in private sales, auctions, or on a subscription basis. Moreover, due to concerns relating to privacy and security, entities that generate and store digital information are disincentivized to make it available to other entities.

SUMMARY

Embodiments of the present invention relate to a claim verification system. More specifically, systems and methods are disclosed relating to the generation of a proof and attestation services notification for verifying a claim or statement of truth. It is generally known that sought-out information about entities can be inaccurate. The reliance on the accuracy of such information, particularly for the advertising industry, can result in wasted resources and other inefficiencies. As such, various embodiments described herein are generally directed to a system and methods that can generate, for third-parties or users, a proof and attestation notification that verifies claims about entities with a calculated and reliable level of certainty. In some embodiments, the claim verification system can receive requests from computing devices of requesting entities to verify claims about specific entities or subjects. A claim can include, among other things, a statement of truth corresponding to a factual statement or a question of fact regarding an entity or a subject. The claim verification system can access data repositories having digital information stored thereon. Each data repository can be searched to identify and retrieve relevant pieces of information about an entity (e.g., an advertising target) or a subject (e.g., a person, a place, an event) based on a received request to verify a claim about the entity or subject. The claim verification system can determine if any of the results at least partially correspond to, or in other words, verify any portion of the claim about the entity or subject. The claim verification system can also calculate a veracity score for the claim based on a determined likelihood that the results support the veracity (e.g., factual accuracy) of the claim. The claim verification system can also generate an attestation notification, which can include or be associated with the calculated veracity score. The attestation notification can indicate whether the claim is true (e.g., by reciting the claim or a corresponding claim), and in some aspects, provide a calculated level of certainty that the claim is in fact true. The generated attestation notification can then be communicated back to the requesting device. In various embodiments of the claim verification system, entities having an interest in determining whether claims associated with another entity or a subject are in fact true, can do so with a calculated degree of certainty. Various embodiments of the claim verification system, components, and methods described herein can enable a trusted party, such as Adobe, Inc. of San Jose, Calif., to provide proof and attestation services to requesting entities in an automated and reliable manner.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
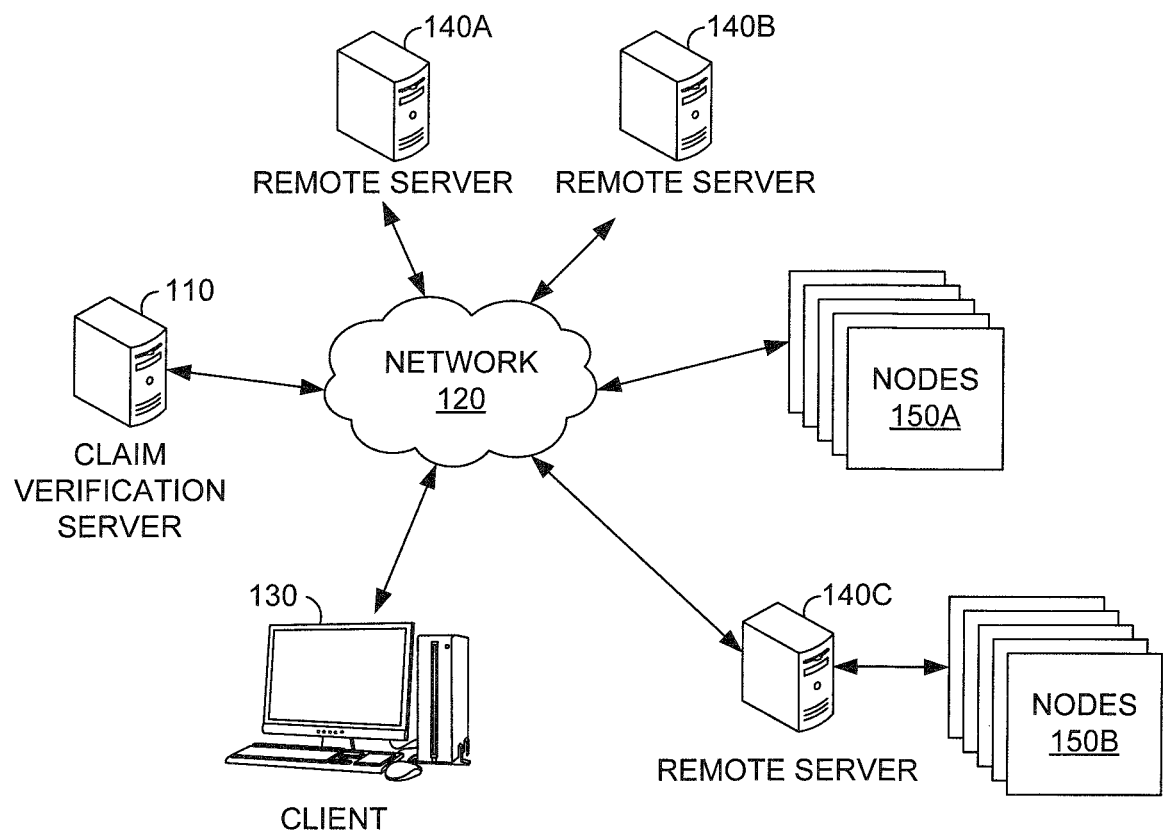
FIG. 1 is an exemplary system diagram of a system for providing proof and attestation services for claim verification in accordance with some embodiments of the present invention.

In conventional data aggregation systems, digital information about a particular entity is either provided as a service to advertising entities (e.g., advertisers or marketers)

or must be actively sought out by the advertising entities. In some aspects, digital information about entities is collected via a platform, such as a social media platform, and access to entities based on demographic criteria can be sold as a service to advertising entities targeting a particular demographic or entity. In some other aspects, digital information about an entity (e.g., an individual, a company, a group, a demographic) can be actively sought out by interested entities (e.g., advertising or marketing agencies). For instance, digital information can be obtained through data mining of public resources (e.g., the World Wide Web) or by requesting specific details about entities from relatively reliable sources, such as manufacturers, retailers, e-commerce companies, coupon companies, or other entities who typically keep records about their customers. It is generally known, however, that the information can be inaccurate, and reliance on the accuracy of such information, particularly for the advertising industry, can result in wasted resources and other inefficiencies. In this regard, techniques are described herein to determine the veracity of data received from external sources. Those who store digital information can be disinterested in openly sharing their digital information with other "untrusted" entities, particularly due to privacy and security concerns. In some instances, mechanisms exist to enable requesters, such as advertisers, to obtain tidbits of specifically-requested information, oftentimes associated with a fee. As described, digital information obtained from a single source can come with reliability risks. However, a trusted proof and attestation service capable of verifying a claim (e.g., a statement of fact) based on an analysis of digital information accessed from multiple data sources can mitigate these risks.

As such, various embodiments described herein are generally directed to a proof and attestation system and related methods that can verify claims about entities or subjects with a calculated and reliable level of certainty. In some embodiments, the proof and attestation system can receive requests from computing devices of interested entities to verify claims about other entities (e.g., advertising targets).

Various terms are used throughout, some of which are described below:

An "entity" or a "subject" can refer to a user, a legal entity (e.g., an association, corporation, partnership, proprietorship, trust, or individual) or even a demographic (e.g., age range, gender, residence, occupation). An "entity" additionally or alternatively may refer to a digital identity, such as a digital account (e.g., a user account), which may be assessed by one or more legal entities.

An "advertising target" can refer to an entity or a subject, as described herein above. Generally, an advertising target is one or more entities or subjects that is a targeted audience of a marketing effort or advertising campaign.

A "claim" can refer to a factual statement or a factual question, such as "John Doe is an Apple user" or "Is John Doe an Apple user?" In general, a claim can include a fact or a question of fact associated with an entity or a subject, such that the fact can be verified or the question can be answered in the affirmative or negative, up to a calculated level of certainty. In general, a claim is comprised of words, terms, keywords, phrases, or sentences.

An "attestation" is an official verification of something (e.g., a claim or a statement) as true or authentic. Generally speaking, an attestation is performed by a disinterested third-party, such as a notary or another entity providing a service as an official verification authority.

The proof and attestation system described in accordance with the present disclosure can access one or more data repositories that each have different sets of digital information stored thereon. In some aspects, each data repository can be associated with different data storage entities, such as independent retailers, manufacturers, social media platforms, and the like, without limitation, whereby trusted access to such data repositories is provided to the proof and attestation system for purposes of claim verification, among other things. In various embodiments, the data in each data repository can be searched to identify and retrieve relevant pieces of information about a target entity (e.g., an advertising target) based on a received request to verify a claim about the target entity.

In some instances, a piece of data retrieved from a data repository can be determined as a primary result, which can include a fact determined to directly confirm the claim (e.g., "John Doe is an Apple user"). In some other instances, a piece of data retrieved from a data repository can be determined as a secondary result, which can include a fact that is determined to indirectly confirm the claim (e.g., "John Doe purchased an Apple computer from Best Buy on Jan. 1, 2018", "John Doe filed a rebate claim for an Apple computer on Jan. 15, 2018"). As such, in accordance with some embodiments, the proof and attestation system described herein can determine the types of results (e.g., primary or secondary) retrieved from various data repositories, and determine if any of the results at least partially correspond to, or in other words at least partially verify or confirm, the primary result and/or the claim about the entity. In another embodiment, a data repository can be selected as a primary data repository based on a determined context of the claim, and any results retrieved therefrom can be designated as a primary result. Similarly, other repositories can be determined tangentially relevant to the claim based on the determined context, and any results retrieved therefrom can be designated a secondary result.

In some further embodiments, the proof and attestation system can calculate a veracity score based on a determined likelihood that a retrieved primary result and/or the claim is verified in light of the other retrieved results. In some aspects, the veracity score can be calculated based on linguistic analyses performed on the claim and the retrieved results. In various embodiments, the linguistic analyses can include, by way of example, natural language processing, statistical analysis, contextual analysis, or other means for comparing terms and statements or the context thereof included in the claim and various results.

In some further embodiments, the proof and attestation system can generate an attestation notification, which can include or be associated with the calculated veracity score. The proof and attestation system can communicate the generated attestation notification back to the requesting device as a response to the received request. In this way, the proof and attestation system, preferably associated with a trusted entity (e.g., an indifferent entity trusted by various data storage entities), can automatically attest to whether claims associated with another entity or subject are in fact true or false with a calculated degree of certainty.

Turning now to FIG. 1, a schematic depiction is provided illustrating an exemplary proof and attestation system 100 for providing proof and attestation services for claim verification in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The proof and attestation system 100 depicted in FIG. 1 includes a claim verification server ("server") 110 that is in communication with a network 120. The system 100 further includes a client device ("client") 130 that is also in communication with the network 120. Among other things, the client can communicate with the server 110 via the network 120, and generate for communication, to the server 110, a request to verify a claim (e.g., a statement of truth) about a particular entity or subject. The request can include, among other things, the claim desired to be verified. The claim can include any number of alphanumeric characters, terms, phrases, statements, keywords, or the like, and is preferably in the form of a factual statement or a factual question, though any format for a claim can be considered within the purview of the present disclosure.

The claim verification server 110 can receive the request communicated from the client 130, and can search for relevant data corresponding to the claim via any number of data repositories to which the server 110 can access, whether remotely or locally. A data repository can include one or more local computing devices or remote computing devices, each accessible to the server 110 directly or indirectly via network 120. In accordance with some embodiments described herein, a data repository can include any of one or more remote servers 140A, 140B, any node (e.g., a computing device) in a distributed plurality of nodes 150A such as those typically maintaining a distributed ledger (e.g., blockchain) network, or any remote server 140C that is coupled to or in communication with any node in a distributed plurality of nodes 150B, such as nodes 150A. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities.

In various embodiments, the claim verification server 110 can retrieve search results from one or more of the data repositories and evaluate result data that is determined to correspond at least in part to the claim. The server 110 can determine whether result data confirms or contradicts the claim, confirms or contradicts other result data that corresponds to the claim, or includes circumstantial evidence that confirms or contradicts the claim and/or other result data that corresponds to the claim. The server 110 can employ a variety of natural language processing, machine learning, text analysis, context extraction, or other techniques for evaluating the claim, retrieved results, and the correlations, likeness, or even contradictions there between. In various embodiments, the server 110 can calculate a score that corresponds to a confidence level that either the claim is in fact true or false, or a score that corresponds to a confidence level that a result corresponding to the claim is in fact true or false. In some aspects, the server 110 can maintain a profile of a particular claim or subject of the claim, whether the subject of the claim is a person, entity, place, sales item, website, or any other object or item of inquiry. In this regard, the server 110 can continuously evaluate the profile, update the profile with additional information retrieved from result data or locally-obtained data, and can employ the profile to positively or negatively impact the confidence level or corresponding calculated score for verifying or negating a particular claim. By way of example, if result data is determined inconclusive (e.g., no or little data) for verifying a claim about a subject, the confidence score calculated for the veracity of the claim can be low. However, as additional result data is obtained about the subject and this data is stored in a profile generated for the subject (or the claim), the confidence score can be increased if result data obtained from various sources corresponds with one another, or decreased if the result data contradicts with one another.

The claim verification server 110 can also generate an attestation notification that includes a statement of fact (e.g., the claim, an inverse or opposing fact of the claim, a retrieved result corresponding to the claim, or a retrieved result corresponding to the inverse of the claim), in addition to a calculated confidence score that corresponds to a likelihood that the statement of fact is true. The server 110 can calculate the confidence score based on results retrieved from various, independent data repositories. The generated attestation notification can then be communicated to the requesting client 130, which can cause the client 130 to provide for display the attestation notification and the calculated confidence score as a result to the received request. In this way, the server 110 can autonomously generate a proof and attestation service notification that requesting entities can employ to ensure that claims regarding an entity are true. As a benefit, the data storage entities can rely on a trusted third party who provides such a proof and attestation service via server 110, without compromising security or other dealing with concerns of data leaks on behalf of other entities.

Figure 2:
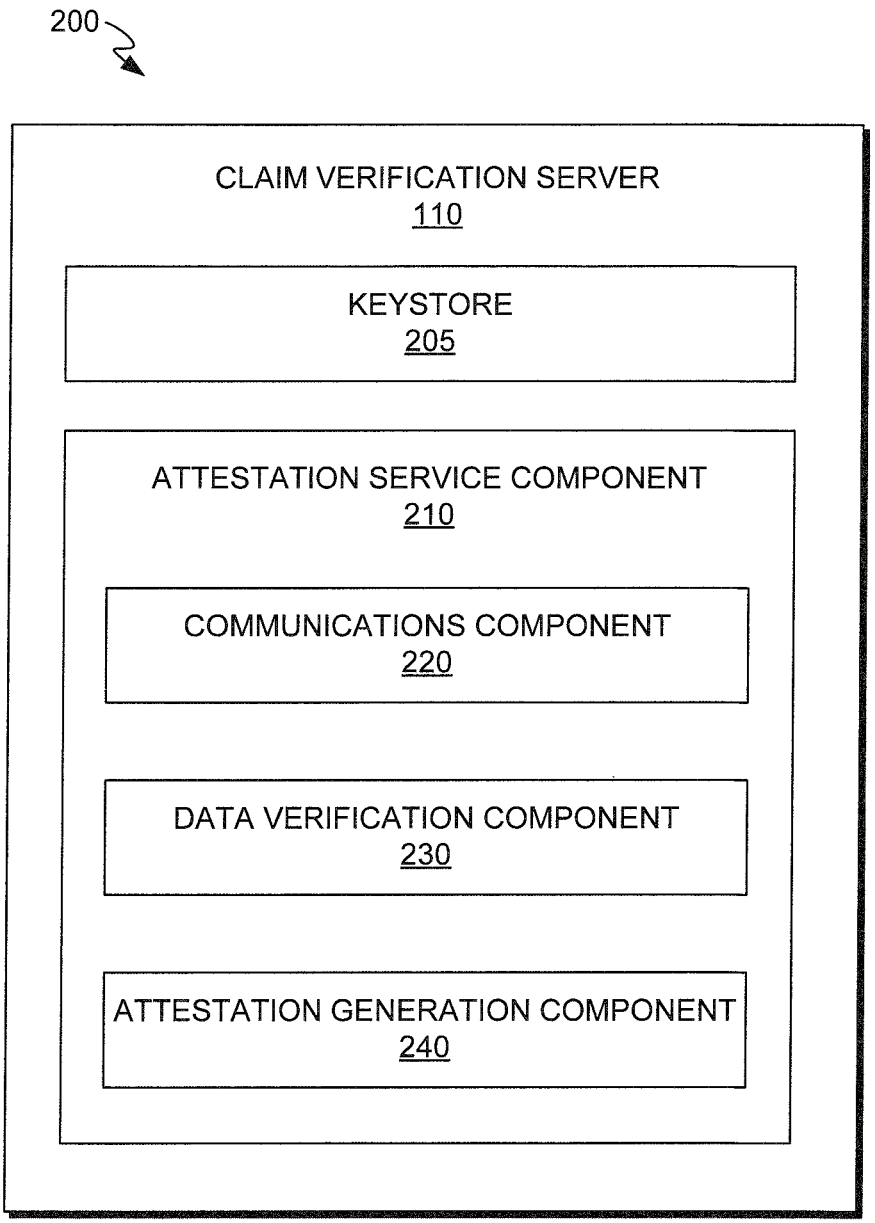
FIG. 2 is a block diagram depicting an exemplary claim verification server device for providing proof and attestation services in accordance with some embodiments of the present invention.

Looking now at FIG. 2, a block diagram 200 depicting an exemplary claim verification server 110 in accordance with some embodiments of the present invention is provided. As described in accordance with FIG. 1, the server 110 can receive requests to determine the veracity of claims, access various data repositories to view, retrieve, and/or search data stored therein to obtain data corresponding to the claim, and among other things, make a determination of likelihood that the claim is true.

It is contemplated that some data repositories may provide public or limited access (e.g. read-only) rights, while others provide privileged-access rights based on determined verified privileged access information. In various embodiments, privileged access information can be provided to the server 110 in various forms, such as login credentials (e.g., username, password), a public key of a private-public key pair, a private key of a private-public key pair, a private symmetric key, a private seed, multi-factor authentication seed, and/or the like. The privileged access information can be provided by third-party servicers (e.g., data storage entities) to the server 110 as a requirement for participation in the proof and attestation service described in accordance with the present disclosure.

The server 110 can store such information into a keystore 205, which can include a secured memory repository that is accessible by the server 110. The keystore 205 can be accessed by the server 110 for retrieval of the privileged access information and employment thereof to access corresponding privileged-access data repositories. It is contemplated that privileged access information is provided only to the server 110, which is preferably associated with a disinterested entity device (e.g., server 110) providing the proof and attestation service to requesting clients (e.g., client 130). In various embodiments, the privileged access information can be provided to the server 110 from each data repository or other computing device(s) (e.g., a client or a server) associated therewith, for storage by the server 110 in keystore 205.

The server 110 can include, among other things, an attestation service component for receiving the request from client 130 of FIG. 1, obtaining relevant data from data repositories (e.g., remote servers 140A-140C, nodes 150A-150B), determining whether the obtained data corresponds to the claim or at least partially to one another to confirm or deny the veracity of the claim, and generating an attestation notification that corresponds to the determination of the claim's veracity, among other things.

The server 110 can also include a communications component 220 that enables communications between the server 110 and other computing devices, such as a client device 130, remote servers 140A-140C and nodes 150A-150B of FIG. 1. Communications can include any type of data transfer between two or more computing devices, such as computing device 600 of FIG. 6, and any of the devices described in FIG. 1 can include such a computing device. Communications can be facilitated via any medium, including a network, such as network 120 of FIG. 1. The network 120 can comprise any communications framework, such as the Internet, LANs, WANs, peer-to-peer communications, wireless networks, wired networks, radio, IR, RF, and the like. Among other things, the communications component 220 can establish communications sessions with other computing devices, receive and send requests, queries, notifications from and to other computing devices, and facilitate the hosting of an interface, such as a website or application service for providing the proof and attestation service described herein.

In accordance with FIG. 1, the server 110 can employ the communications component 220 to receive a request from client device 130 to confirm a claim regarding a defined entity or a subject, generally, establish open or privileged-access communications sessions with other remote computing devices (e.g., remote servers 140A-140C or nodes 150A-150B) to retrieve data therefrom, and communicate to the client device 130 a generated attestation notification corresponding to a veracity of the claim determined by data verification component 230.

The server 110 can also include a data verification component 230 that can be employed to select data repositories for accessing the data stored therein based on the received request (e.g., the claim). In various embodiments, the data verification component 230 can select any or all data repositories to access for obtaining data relevant to the claim. In some embodiments, a data repository can be associated with a set of keywords that is relevant to an entity maintaining the data repository. By way of example, a data repository maintained by computer manufacturer, Apple, Inc., may have keywords "Apple", "computer", "Mac", and the like associated therewith. In some further embodiments, the associated set of keywords can be relevant to the data stored in the data repository. By way of example, a data repository maintained by retailer Best Buy, Inc. may have keywords "Best Buy," "sales records," "customer data," "computers," and the like associated therewith. In various embodiments, associated keywords can be predefined or determined dynamically based on various factors, such as prevalent terms determined to be included in the data repository during or following a communications session established therewith.

As described above, a data repository can be associated with privileged-access information stored in keystore 205. In this regard, based on a selection of the data repository, the data verification component 230 can retrieve a corresponding piece of privileged-access information from the keystore 205 and employ the piece of privileged-access information to establish, via communications component 220, a secured communications session with the selected data repository.

In various embodiments, data verification component 230 can obtain results determined relevant to the request from a variety of data repositories and further analyze the obtained results to determine a likelihood of claim veracity, among other things. In various embodiments, the data verification component 230 can perform a contextual analysis on each of the obtained results to determine whether the result at least in part confirms or debunks (e.g., conflicts with) the claim (e.g., the statement of truth). The data verification component 230 can also employ results of the analysis to determine whether the analyzed result confirms other results determined to confirm the claim. In various embodiments, the data verification component 230 can calculate a score for one or more results that are determined to confirm the claim, based on how many other results also confirm the claim. Likewise, the contextual analysis can be employed to determine whether the result debunks other results determined to confirm the claim, and a score can be modified (e.g., decreased) based on such a determination.

The attestation service component 210 can also include an attestation generation component 240 that generates a notification that corresponds to a determined likelihood that the claim is true. In some other embodiments, the generated notification can correspond to a determined likelihood that the claim is false. In various embodiments, the notification can be generated as a signal, a GUI element, a web element, a XML file, or any other data object that can be communicated from server 110 to client 130, via communications component 220, as a response to the received request. In embodiments, the notification can be generated based on a calculated score that corresponds to a likelihood that the claim is true (or false). In some embodiments, the generated notification can include the calculated score associated with the claim (or a result that corresponds to the claim), indicating a level of confidence that the attestation service component 210 attributes to the veracity of the claim. In this way, the communicated notification can be received by the client 130, which can cause the client 130 to provide for display the notification. The displayed notification can indicate that the trusted proof and attestation provider (e.g., the entity associated with server 110) attests, with a calculated level of certainty, that the claim requested for verification is true (or false).

Figure 3:
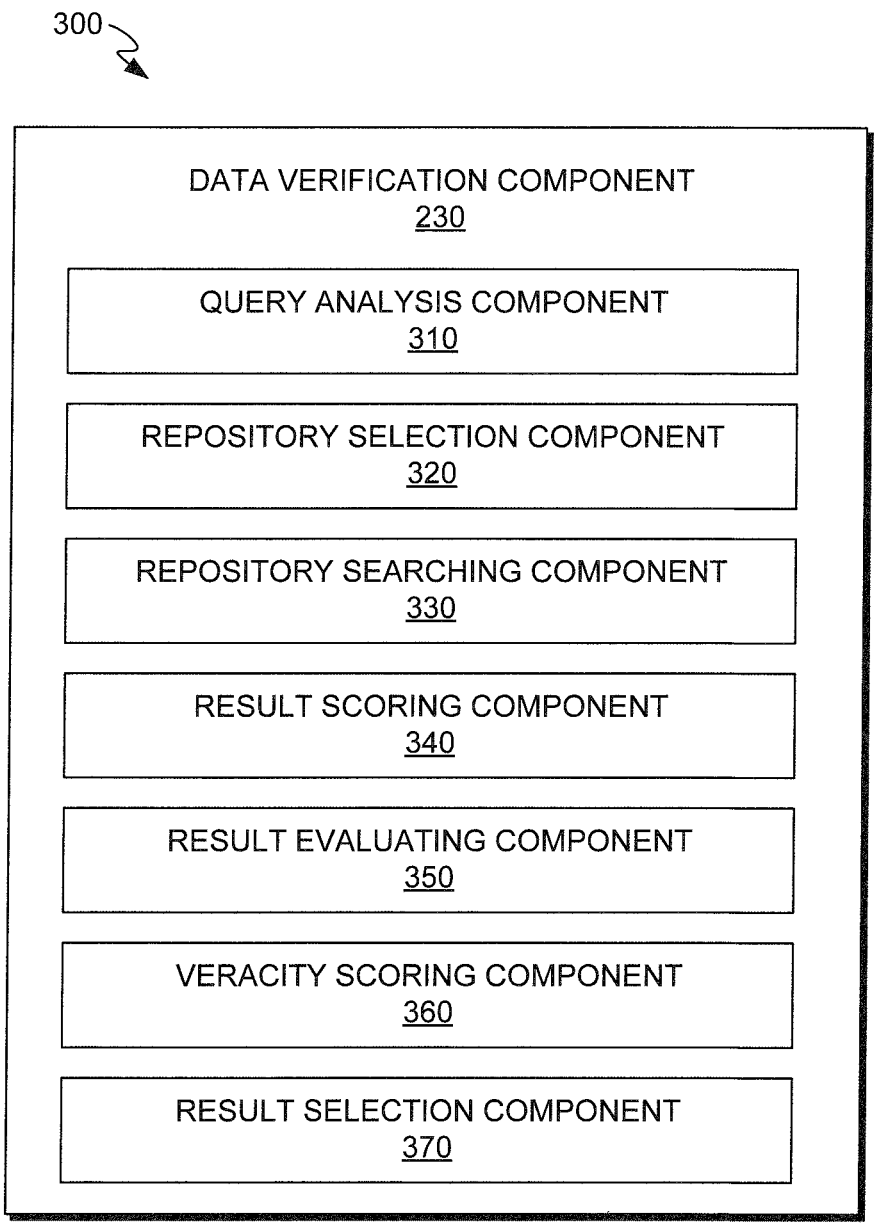
FIG. 3 is a block diagram depicting an exemplary data verification component in accordance with some embodiments of the present invention.

Moving now to FIG. 3, a more detailed look at data verification component 230 is described in accordance with block diagram 300, depicting an exemplary data verification component 230 in accordance with some embodiments of the present invention. As described in accordance with FIG. 2, the data verification component 230 can be incorporated into a computing device, such as server 110 of FIGS. 1-2, and can be employed to determine the veracity of a claim based on a request received from a client device. As noted, data verification component 230 can receive a request to verify a claim from a client, such as client 130 of FIG. 1, via a communications component, such as communications component 220 of FIG. 1.

The data verification component 230 can include a query analysis component 310 that can parse the received request to extract one or more keywords identified therefrom. A keyword can be identified based on a comparison of a term included in the request (e.g., the claim or statement of truth) to a dictionary of known keywords (e.g., names, objects, subjects, entities, actions, statuses, adjectives) or can be identified utilizing natural language processing, record identifiers, and/or keys and corresponding values, among other techniques. The identified keywords can be extracted from the request by query analysis component 310 so that the repository selection component 320 can select one or more relevant data repositories that are determined relevant to the received request.

The repository selection component 320 can receive the request or keywords identified therefrom and select data repositories that are determined most relevant to the request or its identified keywords. In various embodiments, a search engine can be employed to search, for each data repository, an associated set of keywords that can describe an entity associated with the data repository or the type or context of data stored in the data repository. The keywords associated with a data repository can be searched by accessing the data repository, or can be stored locally in a memory of the server 110. The results of the search can identify, among other things, a set of data repositories that is relevant to the request. Any criteria for determining relevant data repositories can be employed within the purview of the present disclosure. For instance, scores, ranks, or numbers of matching terms, are some non-limiting examples of values that can be compared relative to one another, or to predefined thresholds, to determine that a data repository is relevant to the received request.

The data verification component 230 can also include a repository searching component 330 that can be employed to access the selected data repositories, which can include all available data repositories or those determined relevant to the request by repository selection component 320. The repository searching component 330 can access each selected data repository via a network, such as network 120 of FIG. 1, and can employ privileged access information corresponding to the selected data repository if a determination is made that a corresponding piece of privileged access information is stored in a keystore, such as keystore 205 of FIG. 2.

In some embodiments, a data repository can receive a query from the server 110 and perform a search independent the server 110. In this aspect, the query can be generated by repository searching component 330 and can include any portion of the received request (e.g., the claim), which can be modified (e.g., parsed, expanded, shortened) to comply with a search specification defined by the data repository. The repository searching component 330 can generate the query and send the query to the data repository to conduct a search that identifies results (e.g., pieces of data) that the data repository identifies as being relevant to the query. A determination of relevance by a data repository providing a search engine can be made in a variety of manners, such as an identification of matching terms, selection via context analysis, and the like.

In some other embodiments, the data repository merely provides access to the data stored therein. Data repositories such as a distributed ledger (e.g., blockchain) or other databases can be "read-only" sources of data. In this regard, the server 110 can access any node in a plurality of nodes, such as nodes 150A of FIG. 1, that collectively maintain the distributed ledger. In such embodiments, the server 110 can access the node and view or retrieve (e.g., download) the distributed ledger. Data that is retrieved from such data repositories can be analyzed by repository searching component 330, which can identify results having matching terms, contextual similarities, among other things, relative to the request or terms therein.

In some aspects, the data stored on the distributed ledger can be encrypted. In this regard, the data verification component 230 can retrieve and employ a corresponding key to decrypt the encrypted data. In various embodiments, the data stored on the distributed ledger can be encrypted by a variety of keys, which can be associated with any number of entities. In this regard, the server 110 can only decrypt the data that corresponds to the key to which it has access (e.g., stored in keystore 205). In some other embodiments, the data repository is a distributed ledger that is maintained by a plurality of nodes, such as nodes 150B of FIG. 1, and coupled to a remote server, such as remote server 140C of FIG. 1. In some aspects, the remote server 140C can provide privileged-access to the server 110 utilizing any of the described techniques, and can independently retrieve or access data from the distributed ledger to which the remote server 140C has access via any of nodes 150B. In this way, the remote server 140C can store and employ privileged-access information to extract, decrypt, and/or retrieve data from the distributed ledger, and provide different privileged-access information to the server 110 to access the remote server 140C and process a query thereon.

Regardless of how the data is accessed, the repository searching component 330 can search the accessed data repository and obtain a set of results that is determined relevant to the request (i.e., the claim or statement of truth being verified). After open or authorized access with a selected data repository is established and an initial set of results determined to be relevant to the request is obtained, a result scoring component 340 can designate one or more pieces of the determined relevant pieces of obtained data as a result that confirms or conflicts with the claim, confirms or conflicts with a portion of the claim, and/or confirms or conflicts with a portion of another result (e.g., a result that confirms or conflicts with the claim). For purposes of explanation herein, a result that directly confirms or conflicts with a claim can be designated as a primary result, while a result that confirms or conflicts with a portion of a claim or a designated primary result can be designated as a secondary result. In some embodiments, a score can be assigned to each result based on its designation, or based on a determination that the result confirms or conflicts at least in part with the claim.

The result scoring component 340 can make a designation of a primary or a secondary result based on a contextual analysis of a result obtained and determined relevant to the claim based on an initial search of the data repository. Among other things, a contextual analysis can be facilitated by result scoring component 340 utilizing natural language processing, contextual analytics, translation, text expansion, text shortening, and the like. By way of example, for a claim including "John Doe is an Apple user," a contextual analysis of an obtained piece of data including "John Doe purchased an Apple accessory on Jan. 15, 2018" can be determined as being contextually relevant to the claim, but not as being a direct confirmation of the claim. However, the facts that John Doe purchased an Apple accessory, and that the purchase occurred on a relatively recent date, can be determined as relevant factors that at least partially confirm the claim (e.g., that more likely than not John Doe is an Apple user). In various embodiments, a relative score can be determined and assigned to the result based on its determined contextual relevance and/or determined strength of claim confirmation.

With brief reference back to repository selection component 320 and repository searching component 330, a data repository can be designated (e.g., predefined) as a primary data repository based on a belief that the data repository stores reliable information regarding claims having a particular set of keywords, while a designation of secondary data repository can be made based on a belief that the data repository stores reliable, circumstantial-based evidence, regarding claims having the particular set of keywords. For example, a data repository maintained by Apple, Inc. may be designated as a primary data repository for claims having the term "Apple", while a data repository maintained by an authorized retailer of Apple products may be designated as a secondary data repository. By way of example, a claim can include a statement of fact such as, "John Doe is an Apple user." One example of a result that can be received from a primary data repository determined to confirm the claim is "John Doe=Registered Apple User." In another example, if the primary data repository provides a search engine, a processed query including the name "John Doe" and returning a "True" response may correspond to a primary result that directly confirms the claim, while a "False" response may correspond to a primary result that directly debunks the claim. In another example, a result that can be received from a secondary data repository that partially confirms or supports a veracity of the claim is "John Doe purchased Apple accessory on Jan. 15, 2018." Similarly, a search engine of the secondary data repository can return a similar result that provides a more likely than not determination that the claim is true, while a negative result either conflicts with or fails to support the claim's veracity.

Referring back now to result scoring component 340, the result scoring component 340 can assign scores to each result based on a variety of factors. For instance, a higher score can be assigned to results obtained from a primary data repository, while results obtained from a secondary data repository are assigned lower scores. In another instance, contextual similarities can also govern a score for a result, where results determined to be more contextually similar to the claim are assigned a higher score, and results determined to be less contextually similar to the claim are assigned a lower score. In some instances, scores can be determined based on whether the result is determined a primary or a secondary result. By way of non-limiting example, a result determined to be a primary result can be given a score of 1, while a secondary result can be given a score of 0.1. In some instances, if more than one primary result confirms a claim, the corresponding primary results can be merged and/or a score associated with each can be aggregated or increased to demonstrate that more than one primary result confirms the claim. In some embodiments, only results that directly correspond to (e.g., confirm or are determined most contextually similar) to the claim are selected as primary results. In some embodiments, primary results conflicting with one another can decrease a score of one another, or cancel (e.g., decrease to zero) each other's scores out. In various embodiments, a secondary result can be determined to confirm the claim and/or a designated primary result. As such, a secondary result confirming a designated primary result can increase a score associated therewith, or decrease a score if determined to conflict with a designated primary result. The foregoing are merely provided as examples, however, and any variety of score assignments to results based on a determined relevance to and confirmation of the claim can be employable in accordance with the purview of the present disclosure.

In some embodiments, the data verification component 230 can also include a result evaluating component 350 for selecting one or more primary results, and determining which secondary results, if any, correspond to any of the selected one or more primary results. In other words, secondary results that are determined to confirm at least a portion of a primary result can be grouped or mapped to the primary result. In this way, the result evaluating component 350 can group or cluster each primary result with one or more secondary results that confirm at least a portion of the primary result. In some further embodiments, secondary results that are determined to conflict with at least a portion of a primary result can also be grouped or mapped to the primary result. In this way, the result evaluating component 350 can group or cluster each primary result with one or more secondary results that both confirm or conflict with at least a portion of the primary result. In some further embodiments, the result evaluating component 350 can also group multiple primary results together, particularly if they are each determined to each confirm or conflict with the claim. In other words, all primary results confirming the claim can be grouped together, and all primary results conflicting with the claim can be grouped together. In this way, all primary and secondary results confirming the claim can be clustered together, while all primary and secondary results conflicting with the claim can be clustered together.

The data verification component 230 can also include a veracity scoring component 360 that calculates a veracity score for each primary result. As described, a primary result can be associated with one or more secondary results that confirm or conflict with the primary result. As also described, a primary result can be associated with other like primary results. As each primary and secondary result can be associated with a calculated score that corresponds to a determined likelihood that the result confirms or conflicts with the claim, the veracity scoring component 360 can calculate a veracity score for each cluster of primary and secondary results. The veracity score for each cluster can be calculated utilizing a variety of techniques, such as calculating an aggregate sum of scores, an average of scores, a probability distribution of scores, and the like. In some embodiments, clusters having multiple primary results are likely to have a higher calculated veracity score based on the higher scores calculated for each primary result. It is also contemplated that additional weight (e.g., a higher score) can be assigned to clusters having multiple primary results, as a directly confirming result from multiple data repositories can be more reliable than a single confirming result with partially confirming results from multiple data repositories.

The data verification component 230 can also include a result selection component 370 that can compare the scores calculated for the clusters of primary and secondary results to determine which cluster of results is the most significant (e.g., has a highest calculated score). In other words, the result selection component 370 can identify the primary result(s) that have the most substantiating evidence to support its veracity of truth or accuracy. In some embodiments, the result selection component 370 can select a primary result included in a cluster having the highest calculated veracity score, and can communicate the primary result and/or its associated veracity score to attestation generation component 240 of FIG. 2. In this way, the attestation generation component 240 can generate a notification that includes an indication that the claim is true or false, and a calculated likelihood that the claim is true or false, among other things.

Figure 4:
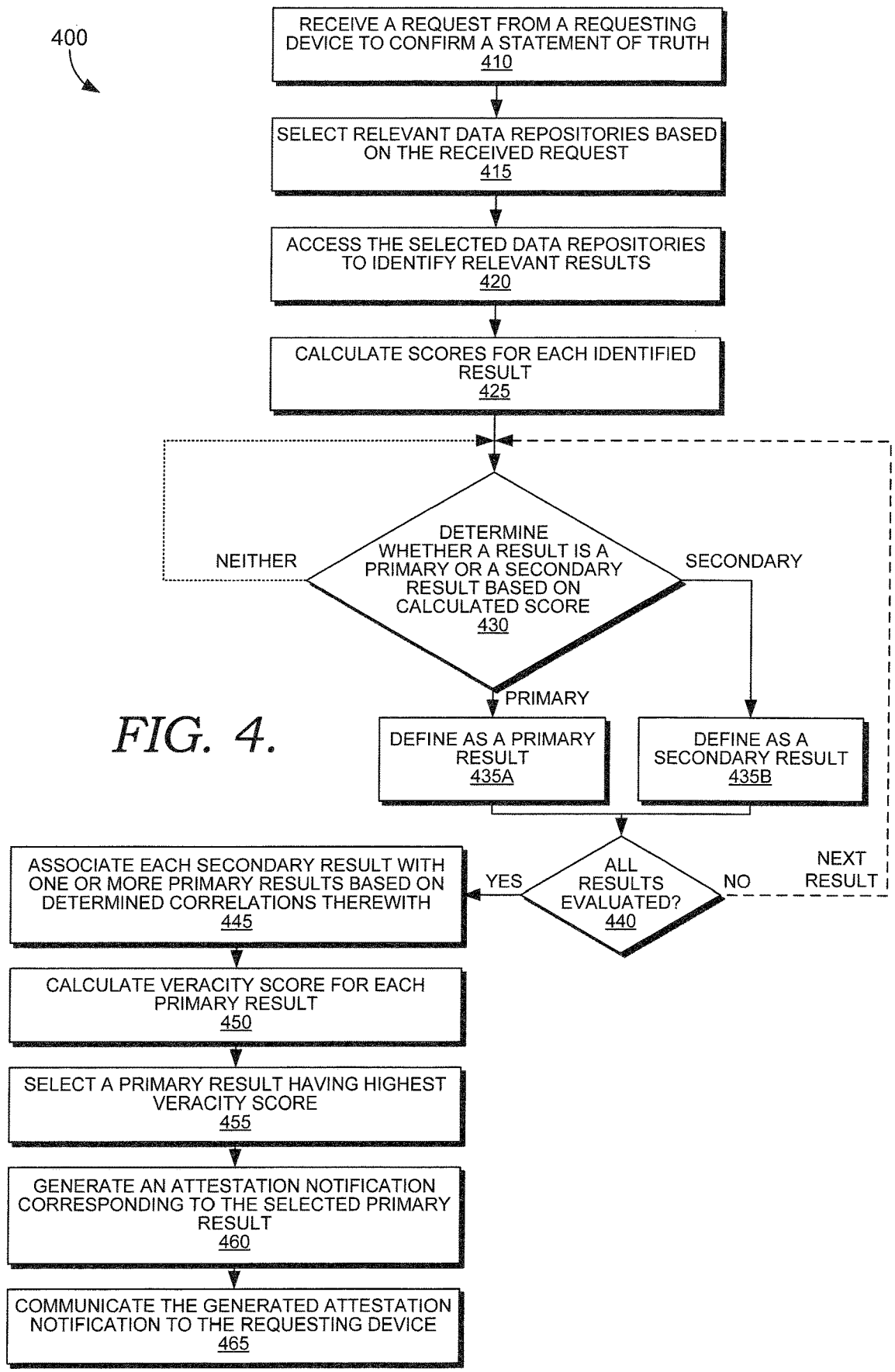
FIG. 4 is a flow diagram showing a method for generating a proof and attestation service notification associated with a claim or a statement of truth, in accordance with some embodiments of the present invention.

Turning now to FIG. 4, a flow diagram is provided that illustrates a method for providing a proof and attestation service notification associated with a claim or statement of truth. At step 410, a server, such as server 110 of FIG. 1, can receive from a client, such as client 130 of FIG. 1, a request to confirm a claim regarding a particular entity or subject. In a preferred embodiment, the claim includes a statement of truth regarding the particularly entity or subject. The server, based on receiving the request from the client, can access one or more data repositories, such as remote servers 140A-140C or any of nodes 150A-150B of FIG. 1 for purposes of searching for results data that is relevant to the claim, among other things. In some embodiments, a data repository can be associated with one or more keywords (e.g., "Best Buy", "retailer", "computers", "warranty", "registration") that are associated with the data storage entity and/or the type of data stored therein.

In various embodiments, a data repository can be associated with a classifier that is defined or determined by the server. The classifier can indicate the reliability or relevance of the data stored therein, and can be determined based on a variety of factors, such as the claim included in the request, an entity name or terms associated with the data repository, or the history of verified data associated with the data repository, among other things. In one example, a claim requested for verification may include the words "John Doe is an Apple user." In this example, the term "Apple" can be employed to determine that a data repository associated with "Apple, Inc." should be designated as a primary data repository due to its high level of relevance to the claim. Continuing on with this example, the server can determine that the term "Apple" is relevant to and/or associated with other keywords, such as "computer", "electronics", "PC", "Mac", and the like. The server can also determine that these other keywords are associated with another data repository, such as "Best Buy, Inc." In some aspects, the keywords associated with any data repository may have a relevance score or value. As such, the server can determine whether another data repository is relevant (e.g., a sum or average relevance score within a particular threshold range) to the claim, and select the other data repository and designate it as a secondary data repository.

In some other embodiments, it is contemplated that data repositories can also be defined with relevance or reliability classifiers determined based on a variety of factors, such as the type of associated data storage entity (e.g., manufacturer, retailer, third-party marketer or advertiser, social media platform), or a determined relevance of stored data in a data repository in light of the claim included in the request. As noted, keywords or terms associated with a data repository and/or the claim can be employed to determine the relevance of a data repository to the claim. It is also contemplated that in various embodiments, the classifiers can be determined and remain static for all claims verification requests, or can be determined dynamically for each received claim verification request.

At step 415, the server can select any or all data repositories to access and search for results (e.g., pieces of stored data). In some aspects, a data repository can be selected for access based on a determined relevance of its associated keywords to the claim included in the request. In some other aspects, all data repositories can be selected for access. The server, at step 420, can access the selected data repositories to conduct a search thereon to identify results determined to be relevant to the claim, or can access the selected data repositories to retrieve the data and locally search the data and locally identify results determined to be relevant to the claim. It is also contemplated that another computing device, such as one providing a search engine, can be employed by the server to identify relevant results. In either implementation, a search engine can be employed to identify relevant results, and any variety of search algorithms can be employed by the search engine to identify such results from a set of data stored in or retrieved from a data repository.

In some embodiments, the server can select data repositories to search for information that is relevant to the request (e.g., the claim or statement of truth). Preferably, only determined relevant (e.g., primary and secondary) data repositories are selected and searched, though any combination of data repositories can be considered for selection and search within the purview of the present disclosure. The server can access the selected data repositories and can generate a query including any portion of the claim included in the request. In some aspects, the claim can be parsed by the server into keywords or key phrases, shortened, expanded, or otherwise modified to comply with any search specifications of a data repository being accessed and searched, or of a search engine being employed to conduct to search. In some aspects, a selected data repository can include a search interface and can receive search parameters to generate a query thereon for searching the data stored therein. In some other aspects, a selected data repository can provide server with access to raw and/or encrypted data that must be parsed, decrypted, and/or searched by the server. Preferably, a unified specification would be employed by all components of the described system to define communication, access, or search requirements between all data repositories, though it is contemplated that any number of data repositories can require unique processes for accessing, searching, or even deciphering (e.g., decrypting) data stored therein.

In some embodiments, a data repository such as a public distributed ledger (e.g., a public blockchain) maintained by a plurality of distributed nodes, such as nodes 150A of FIG. 1, can provide privileged access to data stored in the distributed ledger in a variety of manners. For instance, in some distributed ledgers, digital information can be encrypted with a public key of a private-public key pair so that a specific entity having the private key can employ the private key for decrypting information encrypted with any of its associated public keys. In this scenario, the server can store the private key and issue one or more public keys associated with the private key to any data storage entity that plans to store data on a data repository or a distributed ledger. In this way, despite where the data is stored (e.g., a server memory, a database, or a node memory storing a distributed ledger), as long as the storage device is accessible to the server, the server can employ the private key to decrypt the encrypted data. In a distributed ledger implementation, any node of the distributed plurality of nodes, such as nodes 150A, 150B of FIG. 1, can be accessed to view the distributed ledger stored therein, as each node maintains a copy of the distributed ledger.

In other embodiments, a private distributed ledger maintained by a plurality of distributed nodes, such as nodes 150A of FIG. 1, can provide privileged access to data stored in the distributed ledger. In such embodiments, each node is maintained by an entity in a private network of entities. As each node can include a computing device, such as computing device 600 of FIG. 6, the node can utilize any known technique (e.g., username, password, key pairs, two-factor authentication) for restricting access for anyone other than an authorized entity (e.g., those with authenticated credentials). Unlike a public distributed ledger where any node can be publically accessed, only members of the private blockchain network can access nodes based on authorized credentials. Once accessed, the distributed ledger stored in any node can be searched and/or data can be retrieved therefrom by the authorized entity. It is preferable that the server is provided with credentials limited to a read-only access privilege, though other privileges (e.g., write access) enabled for various purposes is considered within the purview of the present disclosure.

In some other embodiments, a remote server, such as remote server 140C of FIG. 1, can be in communication with a distributed plurality of nodes, such as nodes 150B of FIG. 1, that collectively maintain a distributed ledger, similar to the distributed plurality of nodes 150A of FIG. 1. In this embodiment, the server is communication with the remote server, and the remote server is in communication with any node in the distributed plurality of nodes. In this configuration, the remote server can host an accessible service (e.g., a search engine or other interface) that enables server to search the distributed ledger maintained by the nodes. The remote server can thus securely maintain any private or public keys required to decrypt encrypted data stored on the distributed ledger, and can employ any other security mechanism to provide server privileged access to data independently accessible and/or decrypted by the remote server. It is contemplated that the distributed plurality of nodes can be associated with either one of a public or private distributed ledger network.

The initial determination of relevance of step 420 can be facilitated utilizing any known search technique, including terms matching, context matching, probability distributions, machine learning, and the like. In some embodiments, depending on whether a result is retrieved from a primary data repository or a secondary data repository, the server can designate (e.g., tag, define) the result as a primary or a secondary result based on its data repository of origin. In some other embodiments, each retrieved search result can be evaluated by the server for designation as a primary result, a secondary result, or an irrelevant result, based on a correspondence score that is calculated, at step 425, for the result despite its data repository of origin. The correspondence score for a result can be calculated in a variety of manners, whereby the score corresponds to how likely the result confirms or verifies the claim. In some instances, the correspondence score can be calculated by determining whether a retrieved result (e.g., "John Doe—Apple user") directly corresponds to the claim (e.g., "John Doe is an Apple user"). In some aspects, if a selected data repository is a primary data repository, the score for a result retrieved therefrom can be automatically given a highest score (e.g., 1) and similarly if the data repository is a secondary data repository, the score for the result can be automatically given a lesser score (e.g., 0.1). Alternatively, if no designation is given to the data repository, techniques such as natural language processing, term and context comparisons, probability distributions, or the like can be employed to calculate a correspondence score. Thus, a result determined to have a contextual similarity to the claim (e.g., "John Doe—Apple user") can be given a higher score than another result determined to have a tangential contextual similarity (e.g., "John Doe purchased Apple accessory from Best Buy on Feb. 1, 2018") to the claim.

At step 430, result scores can be compared to threshold scores to determine whether the result is a primary result or a secondary result. For instance, results having a calculated correspondence score exceeding a first threshold (e.g., 0.8-1) can be designated a primary result at step 435A, while results having a calculated correspondence score between a second threshold and the first threshold (e.g., a mid-range score, 0.5-0.8) can be designated a secondary result at step 435B. It is also contemplated that in some embodiments, very tangential results (e.g., "John Doe likes Jane Doe's Facebook post regarding Apple") having calculated correspondence scores below a certain threshold, whether it be the second threshold (e.g., 0.4) or a third threshold (e.g., 0.3) be can be removed from consideration. The foregoing comparisons can be performed for each result until, at step 440, all results are evaluated. The foregoing are provided merely as examples; it is contemplated that any number of scores or thresholds can be employed, and any range or values of calculated correspondence scores can be defined to facilitate the evaluation of results described herein.

At step 445, the server can determine whether any selected non-primary result (e.g., secondary result) verifies or at least partially verifies a designated primary result and/or the claim. Thus, a designated secondary result (e.g., "John Doe purchased Apple accessory from Best Buy on Feb. 1, 2018") can be evaluated to determine whether a designated primary result (e.g., "John Doe—Apple user") or the claim (e.g., "John Doe is an Apple user") is in fact true. In the example for verifying the claim "John Doe is an Apple user," the designated primary result already appears to verify the claim. However, this result is likely retrieved from a single data repository, which is likely a designated primary data repository. In order to confirm the veracity of this primary result or the claim, the designated secondary result is evaluated to determine whether circumstantial evidence further verifies the claim. As such, the secondary result of "John Doe purchased Apple accessory from Best Buy on Feb. 1, 2018" can be evaluated by the server 110, employing natural language processing and/or defined rules, to determine that there is a high correlation between purchases of Apple accessories and being an Apple user. Other factors, such as proximity of time between results or to a current time, can be considered to determine whether results are still relevant and not stale. In this example, the secondary result is determined to confirm both the primary result and the claim that John Doe is, in fact, an Apple user. In some embodiments, correlations between non-primary to primary results or between non-primary results to a claim can be given a correlational weight. In some instances, correlational values can include general rankings (e.g., high, medium, low) or weights (e.g., 1-10). In this regard, the non-primary results retrieved and determined to have a high correlational value can be assigned a higher rank or weight, while other determined correlational values can be respectively assigned a lesser rank or weight.

At step 450, each primary result having one or more other primary results or one or more secondary results determined to be associated with (e.g., or at least partially confirms) the primary result is evaluated, such that the scores of each result in a cluster of associated results are employed in the calculation of a corresponding veracity score. In some aspects, the more primary results and/or secondary results that have a high determined level of correlation to one another and/or confirm at least portions of one another can result in a high veracity score calculated by the server. In some other aspects, the more split primary and/or secondary results are to one another or to a claim can result in a mid-level veracity score calculated by the server. In further aspects, the more primary and/or secondary results contradicting or non-correlated to the claim can result in a low-level veracity score calculated by the server. In various aspects, a calculated low-level veracity score indicating a contradiction to a claim's veracity can also correspond to a calculated high-level veracity score that the claim is not true (e.g., false).

At step 455, the server can select the primary result, or one of a plurality of primary results having a highest calculated veracity score, to generate an attestation notification based thereon. The attestation notification can be generated, at step 460, to include a corresponding primary result, the claim or any portion of the claim included in the received request from the client. The attestation notification can also include, among other things, the calculated veracity score associated with the primary result determined to have a highest veracity score, among other things. In some instances, when an inverse relationship between a primary result (e.g., "John Doe is not an Apple user") and the claim (e.g., "John Doe is an Apple user") is identified, the attestation notification can be generated to show a veracity score associated with the claim (e.g., "John Doe is an Apple User"—"3% confident") or a veracity score associated with the inverse of the claim (e.g., "John Doe is not an Apple User"—"97% confident"). It is contemplated that any variation of the claim and/or associated veracity score can be included in the generated attestation notification. In various embodiments, the attestation notification can be generated as a GUI element, a web element, a message, a document, an object, or any other type of electronically transferable information. At step 465, the server can communicate the generated attestation notification and/or the associated veracity score to the client from which the request was received, thereby causing the client to provide for display the generated attestation notification and/or the associated veracity score.

Figure 5:
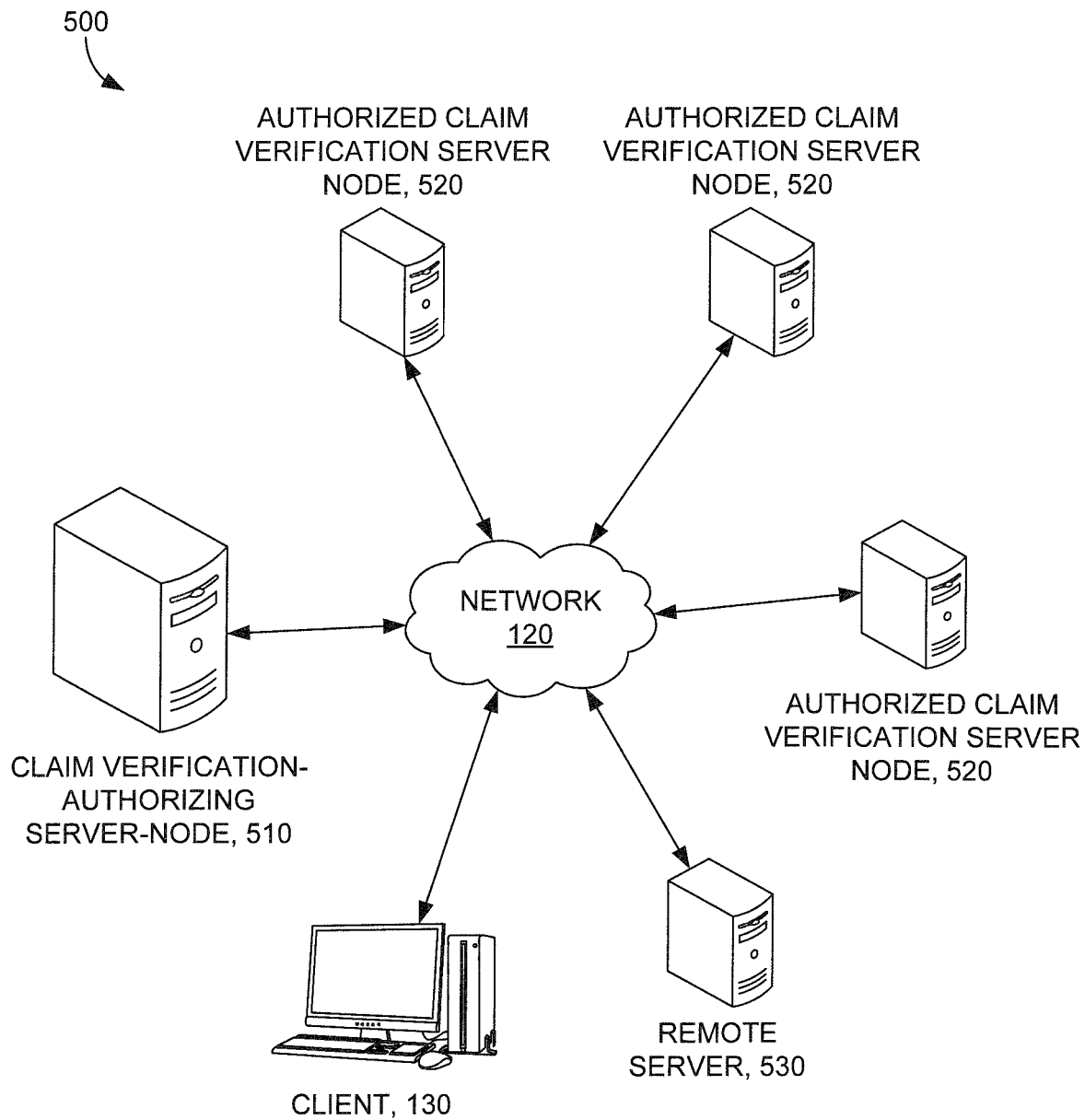
FIG. 5 is an exemplary system diagram of a system for providing proof and attestation services for claim verification in accordance with some other embodiments of the present invention.

Turning now to FIG. 5, a schematic depiction is provided illustrating another embodiment of a proof and attestation system 500 for providing proof and attestation services for claim verification, in which some embodiments of the present invention may be employed. The proof and attestation system 500 depicts the proof and attestation system 100 depicted in FIG. 1 and described in accordance with FIGS. 2-4, in a distributed framework that for generating attestation notifications based on a consensus-based protocol such as practical byzantine fault tolerance, by way of non-limiting example.

In some embodiments, the proof and attestation system 500 can include, among other things, a claim verification authorizing server-node 510, and a plurality of authorized claim verification server-nodes 520, which can collectively maintain a distributed ledger including, among other things, generated attestation notifications (e.g., verified claims and/or corresponding veracity scores). In some further embodiments, the claim verification authorizing server-node 510 is a federated attestation server-node, which has a defined authority to provide other servers, such as any of remote servers 140A, 140B, 140C of FIG. 1, with a privilege to act as an authorized claim verification server-node 520. In accordance with the various embodiments described herein, an authorized claim verification server-node 520 can perform the same or similar functions as described herein with respect to claim verification server 110 of FIG. 1, and can employ data accessible to itself in a local memory or database (not shown) or via other remote servers, such as remote server 530 (also described as any one of remote servers 140A, 140B, 140C of FIG. 1) to verify claims received from a client, such as client 130, as described in accordance with FIG. 1.

The proof and attestation system 500 can be implemented in such a way that an entity, such as the trusted entity associated with claim verification server 110 of FIG. 1, can be associated with the claim verification authorizing server-node 510. In this way, the trusted entity can delegate other remote servers to participate in a federated decentralized network, where the claim verification authorizing server-node 510, and/or any remote servers such as remote servers 140A, 140B, 140C authorized by the claim verification authorizing server-node 510, can act as a claim verification server-node 520 to perform any one or more of the functions, or variations thereof, described in accordance with claim verification server 110.

In some embodiments, the claim verification authorizing server-node 510 and the plurality of authorized claim verification server-nodes 520 can operate as a distributed ledger network, whereby each authorized claim verification server-node 510, 520 functions as a node of the distributed ledger network. The distributed ledger network includes the claim verification authorizing server-node 510 and the plurality of authorized claim verification server-nodes 520, which are each in communication directly or indirectly with one another via a network, such as network 120 of FIG. 1. With the exception of the claim verification authorizing server-node 510 having the privilege to authorize a server, such as remote servers 140A, 140B, 140C of FIG. 1, to act as an authorized claim verification server-node 520, each of the claim verification authorizing server-node 510 and the authorized claim verification server-nodes 520 (either herein also referenced as "server-node 510, 520") can generally operate as a peer to other server-nodes 510, 520. Operations performed by a server-node 510, 520 can include validating transactions (e.g., attestation notifications or claim verifications generated by another server-node), verifying blocks of transactions, and adding records (e.g., validated attestation notifications or validated claim verifications) to an immutable database that is collectively maintained by all of the server-nodes 510, 520.

In some embodiments, the immutable database collectively maintained by the server-nodes 510, 520 can be a blockchain. The blockchain maintained by the server-nodes 510, 520 includes a plurality of records that is immutable by virtue of the distributed nature of the system 500, applied cryptography concepts, and a consensus component (not shown) that is independently included in each of the server-nodes 510, 520. While any server-node 510, 520 can generate an attestation notification to be communicated to a requesting client, such as client 130 of FIGS. 1 and 5, the server-node 510, 520 is not permitted to either generate the attestation notification and/or communicate the generated attestation notification to the requesting client until the verified claim, attestation notification, and/or generated notification, is included into a transaction by the server-node 510, 520 and the transaction is stored to the blockchain. That is, the consensus component requires that a transaction including the verified claim, attestation notification, and/or generated notification be added to a copy of the blockchain stored on each server-node 510, 520 based only on a determination, by the server-node 510, 520, that a consensus (e.g., greater than 50%) of the server-nodes 510, 520 has collectively validated the transaction. In this regard, while each server-node 510, 520 can independently store, update, and/or maintain a copy of the blockchain, a transaction can only be added to the blockchain when a consensus to add the transaction, or in other words a consensus that the transaction is valid, has been determined reached by the server-nodes 510, 520 of the system 500. The determination of consensus can be reached based on messages indicating, among other things, a number of nodes in the system and a number of validations, passed between the server nodes 510, 520 of the distributed ledger network, by way of example.

In some embodiments of the proof and attestation system 500, consensus-based validation of a transaction is facilitated utilizing features of asymmetric key cryptography (i.e., public-private key pairs), and cross-verification of a claim by a consensus of the server-nodes 510, 520. In other words, the server-nodes 510, 520, or at least the one server-node 510, 520 initially verifying a claim, can determine that at least a consensus of the server-nodes 510, 520 has independently verified the claim prior to generating the attestation notification and/or transmitting the generated attestation notification to a requesting client device, as described in accordance with various embodiments of the present disclosure. In some embodiments, only the claim verification authorizing server-node 510 can generate the attestation notification and/or transmit the generated attestation notification to the requesting client device 130, based on a determination that a consensus of the server-nodes 510, 520 has validated the transaction.

In some embodiments, a server-node 510, 520 that first verifies a claim can generate a transaction including the claim, verified claim, and/or generated attestation notification associated with the verified claim. To generate the transaction, the server-node that initially verified the claim or generated the attestation notification or can digitally sign the transaction with its private key. The generated transaction can then be sent to neighboring server-nodes. Each server-node 510, 520 of the distributed ledger network 100, upon receiving the transaction from a neighboring server-node, can independently determine that the transaction and/or its contents (e.g., the verified claim or attestation notification) is valid by verifying the private key of the transaction generating server-node, and also independently verifying the claim (e.g., performing the claim verification process described in accordance with various embodiments of the present disclosure). When a neighboring server-node, or another server node 510, 520 in communication with receiving the transaction, verifies the private key and independently verifies the claim included in or referenced in the transaction, it can pass (e.g., communicate) the transaction on to its neighboring server-nodes 510, 520 so each other neighboring server-node 510, 520 can also validate the transaction (e.g., verify the claim).

As noted, while any server-node 510, 520 can generate an attestation notification to be communicated to a requesting client, such as client 130, it is preferable that either the server-node 510, 520 that initially verified the claim (and generated the transaction for validation) or the claim verification authorizing server-node 510, first determine that a consensus of the server-nodes 510, 520 has validated the transaction (i.e., verified the claim) and/or verified that the transaction is added to the blockchain. To this end, the first claim-verifying server-node 520 or claim verification authorizing server-node 510 can generate the attestation notification and/or communicate the generated attestation notification to the requesting client 130 in accordance with various embodiments described herein.

For purposes of background, a blockchain includes validated transactions that are grouped into a cryptographically chained series of blocks, whereby each block includes a subset of these transactions. In some aspects, only the claim verification authorizing server-node 510 is authorized to generate blocks including transactions validated based on a determined consensus of the server-nodes 510, 520. In some other aspects, any authorized server-node 510, 520 can perform the process of block generation, which can be implemented in a variety of ways based on a consensus algorithm implemented within its consensus component including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the some embodiments. More importantly, as the general outcome of block generation is relatively similar among these implementations, the following description is provided irrespective of the block generation aspect of the consensus component.

To add a validated transaction to the blockchain, the transaction must first be included into a block that is being generated by one of the server-nodes 510, 520 and subsequently validated by a consensus of the server-nodes in the distributed ledger network 100. The transaction can be independently included into a block, or grouped together with other transactions, either of which are included within the purview of the present disclosure. Such implementations may vary, however, based on consensus component design and/or a block size (i.e., memory limitation) implemented or defined within in the consensus component operated by the server-nodes 510, 520. The server-node generating the block must also include, into the block it is generating, a cryptographic hash of the block most-recently added to the blockchain. Once generated in accordance with consensus rules defined within the consensus component, the server-node generating the block can send the generated block to any of the server-nodes to which it is connected for validation and storage onto the receiving server-node's local copy of the blockchain.

The server-nodes 510, 520 receiving the generated block can then verify that the block includes one or more valid transactions, includes a hash value of the block most-recently added to the blockchain, and was generated in accordance with the defined consensus rules. Upon verifying the foregoing, the server-nodes can pass on (e.g., communicate) the verified block to its neighboring server-nodes. In this way, the generated block including at least the transaction can be verified once again by a consensus of the server-nodes. When a determination is made by a consensus of the server-nodes 510, 520 that a block is verified, the newly-verified block is added to the blockchain immediately subsequent to the previously-added block, the hash of the previously-added block being included in the newly-verified block. As such, each block is cryptographically "chained" to a previous block and a subsequent block. In other words, the cryptographic hashes facilitate maintenance of the order and accuracy of transactions included in the blockchain.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 6:
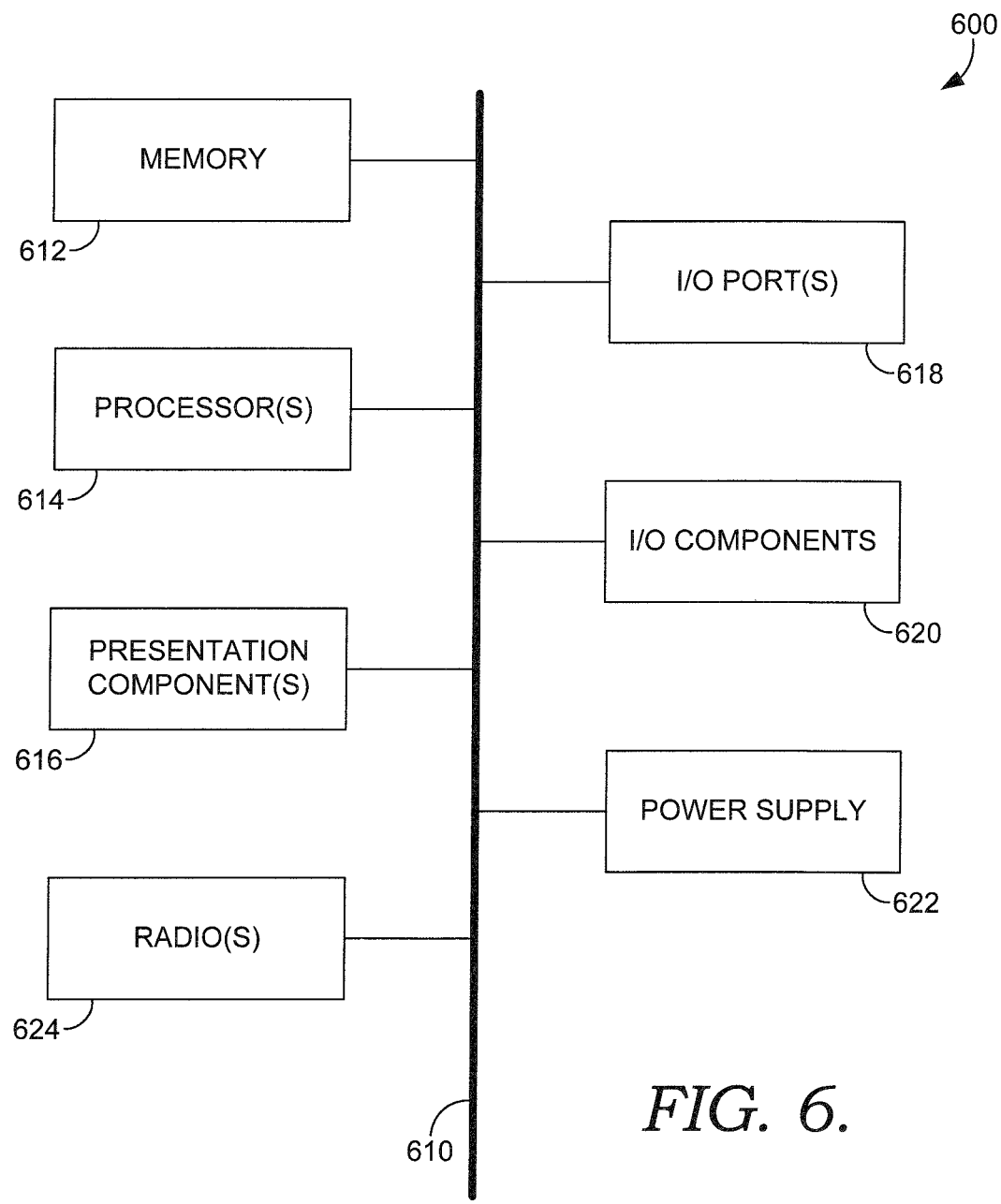
FIG. 6 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Looking now to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer readable medium storing computer-usable instructions that, when used by one or more processors, cause the one or more processors to perform operations comprising:
   receiving a request from a computing device via a network, the received request including a statement of truth;
   selecting a primary data repository and a secondary data repository from a plurality of privileged-access data repositories based on a determined relevancy of a first set of keywords included in the statement of truth to a second set of keywords associated with the primary and secondary data repositories;
   communicating, via the network, the statement of truth to the selected primary and secondary data repositories of the plurality of privileged-access data repositories;
   receiving a first statement of fact and a second statement of fact from the selected primary and secondary data repositories in response to the communicated statement of truth, the first statement of fact being received from the primary data repository based on a determination that the first statement of fact corresponds at least in part to the statement of truth, and the second statement of fact being received from the secondary data repository based on a determination that the second statement of fact corresponds at least in part to the statement of truth;
   generating an attestation notification for the first statement of fact based at least in part on a linguistic analysis indicating that the second statement of fact confirms the first statement of fact; and
   communicating the generated attestation notification to the computing device for display.

2. The non-transitory computer readable medium of claim 1, wherein the generated attestation notification includes a veracity score that is calculated based on a confidence that the second statement of fact confirms the first statement of fact.

3. The non-transitory computer readable medium of claim 1, wherein the linguistic analysis includes calculating a likelihood that the second statement of fact confirms the first statement of fact and comparing the likelihood to a predetermined threshold.

4. The non-transitory computer readable medium of claim 1, wherein each data repository of the plurality of privileged-access data repositories is maintained by one of a plurality of computing devices.

5. The non-transitory computer readable medium of claim 4, wherein each computing device of the plurality of computing devices is associated with one of a plurality of different entities.

6. The non-transitory computer readable medium of claim 1, wherein each data repository of the plurality of privileged-access data repositories includes one of a distributed ledger or a database.

7. The non-transitory computer readable medium of claim 2, wherein the instructions, when used by one or more processors, further cause the one or more processors to:
   store, in a database, the first statement of fact and the calculated veracity score, wherein the database is accessible to retrieve the stored first statement of fact and the calculated veracity score for subsequently-received requests that-include to the statement of truth.

8. The non-transitory computer readable medium of claim 1, wherein the instructions, when used by one or more processors, further cause the one or more processors to:
   determining a veracity score for the first statement of fact, the veracity score corresponding to a determined likelihood that second statement of fact confirms the first statement of fact.

9. The non-transitory computer readable medium of claim 8, wherein the veracity score is determined based further on times associated with the first and second statements of fact.

10. The non-transitory computer readable medium of claim 1, wherein the instructions, when used by one or more processors, further cause the one or more processors to:
    include the veracity score in the generated attestation notification.

11. A computer-implemented method for claim verification, the method comprising:
    receiving, by a server device, a request from a remote computing device via a network, the received request including a statement of truth;
    selecting, by the server device, a primary data repository and a secondary data repository from a plurality of privileged-access data repositories based on a determined relevancy of a first set of keywords included in the statement of truth to a second set of keywords associated with the primary and secondary data repositories;
    communicating, by the server device, the statement of truth via the network to the selected primary and secondary data repositories of the plurality of privileged-access data repositories;
    receiving, by the server device, a first statement of fact and a second statement of fact from the selected primary and secondary data repositories in response to the communicated statement of truth, the first statement of fact being received from the primary data repository based on a determination that the first statement of fact corresponds at least in part to the statement of truth, and the second statement of fact being received from the secondary data repository based on a determination that the second statement of fact corresponds at least in part to the statement of truth;
    generating, by the server device, an attestation notification for the first statement of fact based at least in part on a linguistic analysis indicating that the second statement of fact confirms the first statement of fact; and
    communicating, by the server device, the generated attestation notification to the remote computing device for display.

12. The computer-implemented method of claim 11, wherein the generated attestation notification includes a veracity score that is calculated based on a confidence that the second statement of fact confirms the first statement of fact.

13. The computer-implemented method of claim 11, wherein the linguistic analysis includes calculating a likelihood that the second statement of fact confirms the first statement of fact, and comparing the likelihood to a predetermined threshold.

14. The computer-implemented method of claim 11, wherein each data repository of the plurality of privileged-access data repositories is maintained by one of a plurality of remote servers.

15. The computer-implemented method of claim 14, wherein each remote server of the plurality of remote servers is associated with one of a plurality of different entities.

16. A system for claim verification, the system comprising:
- at least one processor, and
- at least one memory device storing computer-usable instructions that, when used by the at least one processor, cause the at least one processor to:
- receive a request from a computing device via a network, the received request including a statement of truth;
- select a primary data repository and a secondary data repository from a plurality of privileged-access data repositories based on a determined relevancy of a first set of keywords included in the statement of truth to a second set of keywords associated with the primary and secondary data repositories;
- communicate, via the network, the statement of truth to the selected primary and secondary data repositories of the plurality of privileged-access data repositories;
- receive a first statement of fact and a second statement of fact from the selected primary and secondary data repositories in response to the communicated statement of truth, the first statement of fact being received from the primary data repository based on a determination that the first statement of fact corresponds at least in part to the statement of truth, and the second statement of fact being received from the secondary data repository based on a determination that the second statement of fact corresponds at least in part to the statement of truth;
- generating an attestation notification for the first statement of fact based at least in part on a linguistic analysis indicating that the second statement of fact confirms the first statement of fact; and
- communicating the generated attestation notification to the computing device for display.

17. The system of claim 16, wherein the generated attestation notification includes a veracity score that is calculated based on a confidence that the second statement of fact confirms the first statement of fact.

18. The system of claim 16, wherein the linguistic analysis includes calculating a likelihood that the second statement of fact confirms the first statement of fact and comparing the likelihood to a predetermined threshold.

19. The system of claim 16, wherein each data repository of the plurality of privileged-access data repositories is maintained by one of a plurality of computing devices.

20. The system of claim 16, wherein each data repository of the plurality of privileged-access data repositories includes one of a distributed ledger or a database.

* * * * *